United States Patent
de Souza et al.

(10) Patent No.: US 7,031,955 B1
(45) Date of Patent: Apr. 18, 2006

(54) OPTIMIZATION USING A MULTI-DIMENSIONAL DATA MODEL

(75) Inventors: Pedro S. de Souza, Flower Mound, TX (US); Assia Abada, Irving, TX (US); Rajasekhar Mallipeddi, Flower Mound, TX (US); Yasser A. Kazzaz, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 720 days.

(21) Appl. No.: 09/844,847

(22) Filed: Apr. 27, 2001

(51) Int. Cl.
*G06F 17/30* (2006.01)

(52) U.S. Cl. .................. 707/3; 707/10; 707/100; 707/2

(58) Field of Classification Search ............... 707/3, 707/4, 5, 10, 101, 102, 103 Y, 103, 2, 100
See application file for complete search history.

(56) References Cited

U.S. PATENT DOCUMENTS

| | | | | |
|---|---|---|---|---|
| 5,832,475 A * | 11/1998 | Agrawal et al. | ............... | 707/2 |
| 5,926,818 A * | 7/1999 | Malloy | ............... | 707/100 |
| 5,978,788 A * | 11/1999 | Castelli et al. | ............... | 707/2 |
| 6,363,338 B1 * | 3/2002 | Ubale et al. | ............... | 704/200.1 |
| 6,434,544 B1 * | 8/2002 | Bakalash et al. | ............... | 707/2 |
| 6,438,537 B1 * | 8/2002 | Netz et al. | ............... | 707/3 |
| 6,611,839 B1 * | 8/2003 | Nwabueze | ............... | 707/101 |
| 6,631,364 B1 * | 10/2003 | Rioux et al. | ............... | 707/2 |
| 6,671,680 B1 * | 12/2003 | Iwamoto et al. | ............... | 707/3 |
| 6,684,206 B1 * | 1/2004 | Chen et al. | ............... | 707/3 |
| 6,684,207 B1 * | 1/2004 | Greenfield et al. | ............... | 707/3 |
| 6,714,979 B1 * | 3/2004 | Brandt et al. | ............... | 707/3 |
| 6,750,864 B1 * | 6/2004 | Anwar | ............... | 345/440 |
| 6,775,675 B1 * | 8/2004 | Nwabueze et al. | ............... | 707/100 |
| 6,778,981 B1 * | 8/2004 | Lee et al. | ............... | 707/3 |
| 6,917,940 B1 * | 7/2005 | Chen et al. | ............... | 707/10 |

OTHER PUBLICATIONS

Agrawal et al. Efficient algorithm for geometric optimzation, ACM Computing Surveys, 1998, pp. 412-458.*

* cited by examiner

*Primary Examiner*—Jean M. Corrielus
*Assistant Examiner*—Baoquoc N. To
(74) *Attorney, Agent, or Firm*—Steven J. Laureanti; James E. Walton

(57) ABSTRACT

A system (10) for optimization using multi-dimensional data includes a server (12) that uses a multi-dimensional data model to organize data stored at one or more data storage locations (14). The multi-dimensional data model includes a number of data dimensions (50, 70) that each include a hierarchy of members (54, 74). The server (12) receives input from a user specifying a problem instance to be solved using an optimization engine (20). The problem instance is specified by the user in a multi-dimensional format and the optimization engine (20) is unable to solve the problem instance in the multi-dimensional format. The system (10) also includes a transformation module (22) that receives the problem instance in the multi-dimensional format, transforms the problem instance into a format appropriate for the optimization engine (20), and communicates the transformed problem instance to the optimization engine (20) to be solved.

20 Claims, 8 Drawing Sheets

US 7,031,955 B1

OPTIMIZATION USING A MULTI-DIMENSIONAL DATA MODEL

TECHNICAL FIELD OF THE INVENTION

This invention relates to the field of optimization, and more particularly to optimization using a multi-dimensional data model.

BACKGROUND OF THE INVENTION

The data associated with a business is often stored in a number of different locations and formats. A business may integrate and manage this data by creating one or more multi-dimensional data models that organize the data hierarchically in one or more data dimensions. The use of such a multi-dimensional data model allows a user to readily and generically store, access, and manipulate the data associated with the business. For example, the user may specify particular data by referring to a particular level in the hierarchy of a dimension or by specifying the intersection of a member in each dimension.

SUMMARY OF THE INVENTION

According to the present invention, disadvantages and problems associated with previous optimization techniques have been substantially reduced or eliminated.

According to one embodiment of the present invention, a system for optimization using multi-dimensional data includes a server that uses a multi-dimensional data model to organize data stored at one or more data storage locations. The multi-dimensional data model includes a number of data dimensions that each include a hierarchy of members. The server receives input from a user specifying a problem instance to be solved using an optimization engine. The problem instance is specified by the user in a multi-dimensional format and the optimization engine is unable to solve the problem instance in the multi-dimensional format. The system also includes a transformation module that receives the problem instance in the multi-dimensional format, transforms the problem instance into a format appropriate for the optimization engine, and communicates the transformed problem instance to the optimization engine to be solved.

Particular embodiments of the present invention may provide one or more technical advantages. For example, certain embodiments provide for the modeling of business problems using multi-dimensional data concepts and the translation of such a model to a format that an optimization engine can interpret. After obtaining a solution to the problem from the optimization engine, the solution may be translated back to the multi-dimensional data format in which the original business problem was modeled. Unlike traditional techniques for formulating optimization problems, the formulation of business problems using multi-dimensional concepts typically does not require advanced training and requires only limited knowledge of optimization techniques. Therefore, embodiments of the present invention provide a user with the ability to formulate optimization problems even though the user may not be familiar with the optimization engine used to solve the problems.

In addition, by using data from a multi-dimensional data model, a user can access data from a number of different sources, integrate this data, and communicate the data to the optimization engine as needed. Furthermore, particular embodiments of the present invention allow the user to specify problems using logic and constraints that are independent of the data to be used in solving the problem. Therefore, the same problem definition can be reused with different data sets. Moreover, problem definitions may be readily modifiable and may be shared among users.

Other important technical advantages are readily apparent to those skilled in the art from the following figures, description and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
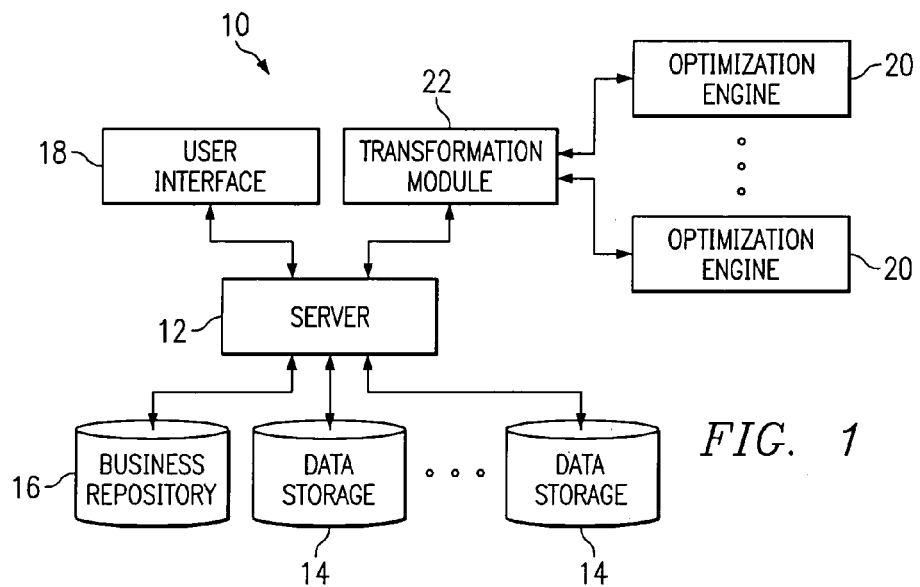
FIG. 1 illustrates an exemplary multi-dimensional data optimization system.

FIG. 1 illustrates an exemplary multi-dimensional data optimization system 10. System 10 includes a server 12 that enables a user of system 10 to manage and manipulate data stored in one or more data storage locations 14. Data storage locations 14 may include databases or any other appropriate data storage devices or techniques. For example, one or more of the data storage locations 14 may be data marts and/or data warehouses associated with a business that are each used to store data relating to a particular aspect of the business. For instance, one or more data storage locations 14 may include financial data such as sales data, cost data, payroll data, and other related data. Data storage locations 14 may be physically distributed across a region or across the world. For example, a data storage location 14 located in Texas may be used to store financial information about a branch of a business in Texas and a data storage location 14 located in New York may be used store financial information about a branch of the business in New York. Any appropriate number of data storage locations 14 located in any appropriate number of locations may be used.

In one embodiment, although the data relating to a business may be distributed throughout a number of data storage locations 14, server 12 provides a business or other user with the ability the manage and manipulate all of the data as of it were in a single location. For example, server 12 allows a user to model the data stored in data storage locations 14 to create a multi-dimensional and hierarchical representation of the data. This multi-dimensional data model may be stored in a business repository 16 that is associated with server 12. In particular embodiments, business repository 16 may be incorporated in server 12.

As an example only, the data model may include three dimensions: a product dimension, a geography dimension, and a time dimension. However, the present invention contemplates a data model having as few or as many dimensions as appropriate for a particular application, and other suitable dimensions may replace or be combined with the product, geography, and time dimensions according to particular needs. Each dimension includes a number of members, which are each a tangible instance of the dimension. For example, the geography dimension may include "U.S." and "Northeast" as members. As described below, the members in a product dimension are hierarchically related. For example, the "Northeast" member of the geography dimension may be a child of the "U.S." member of the same dimension. Furthermore, members in different dimensions may also be hierarchically related. The hierarchy of a dimension may be divided into levels such that "equal" members in the dimension occupy the same level. For example, a "Northeast" member and a "Southeast" member may be included in the same level of the geography dimension (for example, in a "region" level).

An intersection in the data model may be identified by specifying a set that includes a member from each dimension. Therefore, an intersection is basically a set of coordinates, where each coordinate is a member in a dimension. Each intersection in the data model has one or more associated data measures. Each data measure has associated data values that are stored in data storage locations 14. Exemplary data measures include sales, cost, price, margin, total expense, supply, demand, and profit. Numerous other types of data measures relating to any appropriate aspect of a business or other entity may also or alternatively be used. Each data measure at each intersection may be associated with a particular data value in a data storage location 14. In summary, the data stored in data storage locations 14 may be modeled by creating a number of dimensions, each dimension having a number of members that are hierarchically related. The data may then be associated with a particular intersection defined by identifying a member from each dimension.

Figure 2:
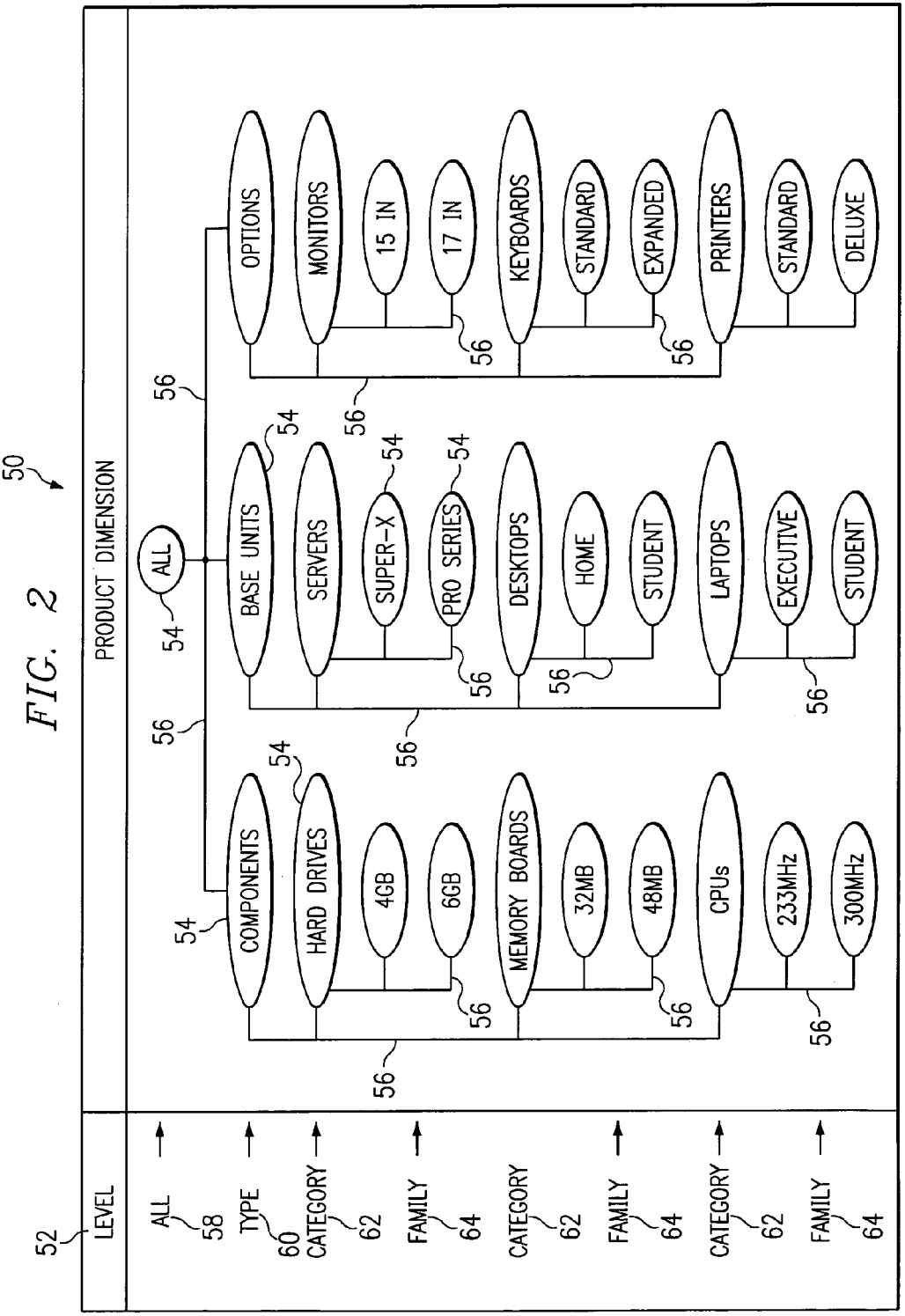
FIG. 2 illustrates an exemplary product dimension of a multi-dimensional data model.

FIG. 2 illustrates an exemplary product dimension 50 of a multi-dimensional data model that includes a hierarchy of product levels 52 each having one or more members 54. A combination of a member from each of a number dimensions forms as intersection. The value of each data measure associated with an intersection is an aggregation of the values of corresponding data measures associated with hierarchically related members in lower levels of each of the dimensions. For example, assuming there was only a product dimension 50, the number of sales associated with a member 54 is the aggregate sales for these hierarchically related members 54 in lower levels 52 of product dimension 50. In the illustrated embodiment, product levels 52 for product dimension 50 include an all products level 58, a product type level 60, a product category level 62, and a product family level 64. Selected and merely exemplary hierarchical relationships between members 54 are shown using links 56, as described more fully below. Links 56 between hierarchically related members 54 in adjacent levels 52 of product dimension 50 reflect parent-child relationships between members 54. Although FIG. 2 is described primarily in connection with product sales, the following description is similarly applicable to other data measures, such as cost, price, margin, total expense, supply, demand, profit, or any other appropriate data measures.

In the particular example shown in FIG. 2, all products level 58 contains "All" member 54 representing the aggregate sales for all members 54 in lower levels 60, 62, and 64 of product dimension 50. Product type level 60 contains "Components," "Base Units," and "Options" members 54. "Components" member 54 represents the aggregate sales for hierarchically related members 54 below "Components" member 54 in levels 62 and 64 of product dimension 50. Similarly, "Base Units" member 54 represents the aggregate sales for hierarchically related members 54 below "Base Units" member 54 and "Options" member 54 represents the aggregate sales for hierarchically related members 54 below "Options" member 54. Links 56 between "All" member 54 and "Components," "Base Units," and "Options" members 54 indicate the hierarchical relationships between these members 54.

Product category level 62 contains, under "Components" member 54, "Hard Drives," "Memory Boards," and "CPUs" members 54. "Hard Drives" member 54 represents the aggregate sales for hierarchically related members 54 below "Hard Drives" member 54 in level 64 of product dimension 50. Similarly, "Memory Boards" member 54 represents aggregate sales for hierarchically related members 54 below "Memory Boards" member 54 and "CPUs" member 54 represents the aggregate sales for hierarchically related members 54 below "CPUs" member 54. Links 56 between "Components" member 54 and "Hard Drives," "Memory Boards," and "CPUs" members 54 indicate the hierarchical relationships between these members 54. Analogous links 56 reflect hierarchical relationships between "Base Units" and "Options" members 54 of product type level 60 and corresponding members 54 in lower levels 62 and 64 within product dimension 50.

Product family level 64 contains, under "Hard Drives" member 54, "4 GB" and "6 GB" members 54. Links 56 between "Hard Drives" member 54 and "4 GB" and "6 GB" members 54 indicate hierarchical relationships between these members 54. Analogous links 56 reflect hierarchical relationships between "Memory Boards," "CPUs," "Servers," "Desktops," "Laptops," "Monitors," "Keyboards," and "Printers" members 54 of product category level 62 and corresponding members 54 in lower level 64 within product dimension 50. Although no links 56 are shown between members 54 in product family level 64 and possible lower levels 52, the present invention contemplates such further levels 52 existing within product dimension 50 and analogous links 56 to reflect the corresponding hierarchical relationships. Furthermore, members 54 shown in FIG. 2 are exemplary only and are not intended to be an exhaustive set of all possible members 54. Those skilled in the art will appreciate that other suitable members 54 and associated links 56 may exist without departing from the intended scope of the present invention.

Figure 3:
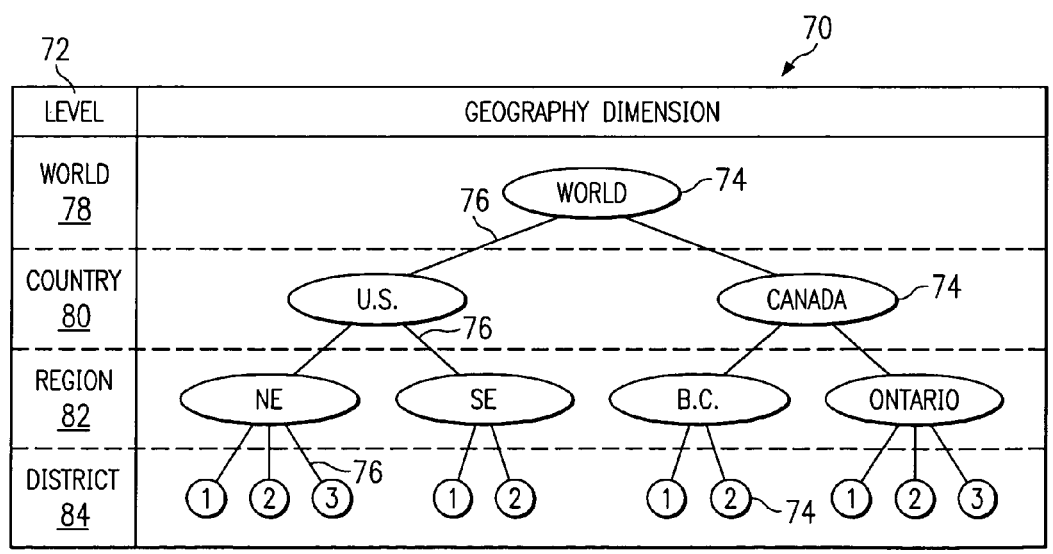
FIG. 3 illustrates an exemplary geography dimension of a multi-dimensional data model.

FIG. 3 illustrates an exemplary geography dimension 70 of a multi-dimensional data model that includes a hierarchy of geography levels 72 each having one or more members 74. In the illustrated embodiment, geography levels 72 for geography dimension 70 include a world level 78, a country level 80, a region level 82, and a district level 84. Selected and merely exemplary hierarchical relationships between members 74 are shown using links 76, which are analogous to links 56 described above with reference to FIG. 2. Although FIG. 3 is described primarily in connection with product sales, the following description is similarly applicable to other data measures, such as cost, price, margin, total expense, supply, demand, profit, or any other appropriate data measures.

In the particular example illustrated in FIG. 3, world level 78 contains "World" member 74 representing aggregate worldwide sales. Country level 80 contains "U.S." and "Canada" members 74, which represent aggregate sales for the United States and Canada, respectively. Link 76 between "U.S." members 74 in country level 80 and "World" members 74 in world level 78 indicates a hierarchical relationship between these members 74. Similarly, link 76 between "Canada" member 74 and "World" member 74 indicates a hierarchical relationship between these members 74. In this example, worldwide sales is an aggregation of aggregate sales in the United States as well as aggregate sales in Canada. Although other links 76 are not described in detail, those skilled in the art will appreciate that links 76 are analogous to links 56 described above with reference to FIG. 2 in that each represents a corresponding hierarchical relationship between members 74 in the various levels 72 of geography dimension 70.

Returning to FIG. 1, a user may use server 12 and business repository 16 to create, modify, and store a multi-dimensional data model and to access particular data identified using the nomenclature developed in the data model. For example, a user may specify the various dimensions and members of the dimensions. Furthermore, the user may specify various data measures and may identify the location of data associated with the data measures at each intersection. Once such a multi-dimensional data model is established, the user may then access and manipulate the data using the nomenclature of the data model. A user may provide input to and receive output from server 12 using a user interface 18. User interface 18 may be associated with or located remotely from server 12. For example, in a particular embodiment, user interface 18 may be a web browser allowing the user to access server 12 using the Internet. In such a case, server 12 may communicate web pages (such as hypertext markup language (HTML) or extensible markup language (XML) pages) to the user that provide information to the user and that allow the user to enter information to be provided to server 12.

In particular embodiments, one or more data storage locations 14 support multi-dimensional on-line analytical processing (OLAP) capability and are populated with data measures received from one or more transactional data sources that are internal, external, or both internal and external to a business associated with system 10. For example, and not by way of limitation, data measures received from sources internal to a manufacturing or warehousing facility may include unit shipping data, dollar shipping data, inventory data, pricing data, and any other suitable information. Data measures received from external sources, such as from partners of the business, may include point-of-sale demographic data and any other suitable information. The present invention contemplates appropriate data measures being stored in data storage locations 14 in any suitable manner.

System 10 may also include one or more optimization engines 20 and one more transformation modules 22 coupling the optimization engines 20 to server 12. Optimization engines 20 are used to solve various problems associated with a business or other entity. For example, optimization engines 20 may be used to solve linear programming, integer programming, mixed-integer linear programming, mixed-integer non-linear programming, and other appropriate problems in areas such as planning, scheduling, sequencing, resource allocation, design, and configuration. In order to solve an optimization problem, the problem must first be formulated by a user. For example, a user may generate a problem using the Optimization Programming Language (OPL). However, the formulation of such optimization problems is typically a complex undertaking and requires advanced training. Unlike the formulation of optimization problems, server 12 and business repository 16 allow a relatively inexperienced user to create and manage a multi-dimensional data model so as to provide a user with meaningful visibility to data of the associated business. However, users have not been able to use the multi-dimensional data model and its nomenclature to formulate optimization problems and to communicate such problems and associated data to optimization engines.

System 10, however, provides the ability for a user to create an optimization problem using multi-dimensional data nomenclature. The user provides the problem specification (for example, the data measure to be optimized, constraints to be met, and a multi-dimensional data set) to server 12 using user interface 18. The problem specification may be stored by server 12 or an associated component. Based on the problem specification, server 12 stores and retrieves appropriate information from the business repository 16 and one more data storage locations 14. Server 12 then communicates the problem specification to transformation module 22. In particular embodiments, transformation module 22 may be incorporated in server 12. Transformation module 22 transforms the multi-dimensional data and problem specification into a representation that allows an appropriate optimization engine 20 to solve the problem. A solution to the problem is then communicated back to the transformation module 22 from the optimization engine 20, and transformation module 22 transforms the solution into a format consistent with the multi-dimensional data model and communicates the transformed solution to the user via server 12 and user interface 18. The user may then determine whether further analyses are needed. The various components of system 10 used in this process may be implemented as any appropriate combination of hardware and/or software operating in association with one or more computers in one or more locations. Furthermore, the various components may communicate using any appropriate communication links and using any appropriate communication techniques.

Figure 4:
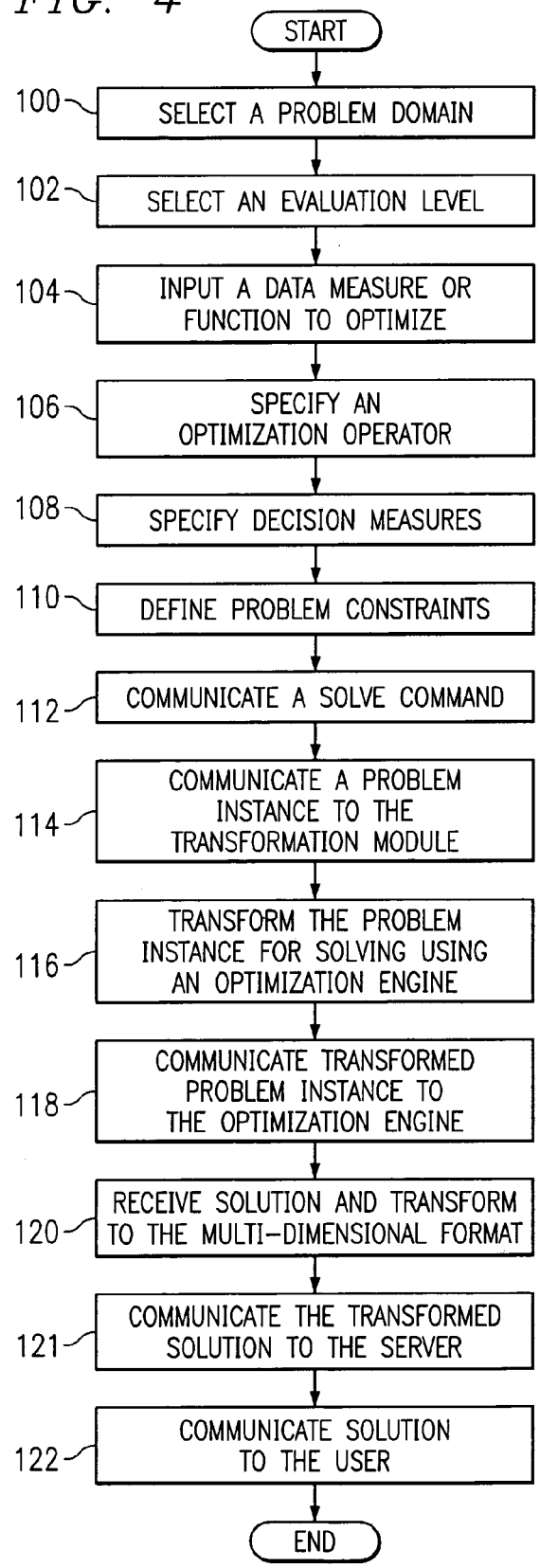
FIG. 4 illustrates an exemplary method for generating and solving an optimization problem using multi-dimensional data.

FIG. 4 illustrates an exemplary method for generating and solving an optimization problem using multi-dimensional data. The method begins at step 100 where a user selects a domain for the problem to be solved. The domain of the problem is the set of multi-dimensional data that the problem involves. The domain may include all of the data in a multi-dimensional data model or it may include only a subset of that data. The domain may be specified by identifying an intersection of the data model. The members in each dimension at and under (hierarchically) that intersection may be considered the domain. For a given domain, the user selects at step 102 the level of the multi-dimensional data model at which the problem is to be evaluated—the evaluation level. The evaluation level is the lowest level in each dimension that the user wants the optimization engine 20 to consider. The data measures at a lower level than the evaluation level may have their values aggregated to an appropriate parent member at the evaluation level.

Collectively, the domain and evaluation level define the scope of the problem to be solved. For each problem scope, the user may have several problem structures that may be considered. As described below, each problem structure includes a business objective, an optimization operator, and one or more constraints. Collectively, a problem scope and a problem structure define a problem instance, with each problem instance having an associated solution.

At step 104, the user initiates the creation of a problem structure by inputting a data measure or function to be optimized (the "objective function"). As described below, the user may input any appropriate analytical expression for a function and the function may include appropriate aggregation domain(s) for the data measures included in the function. The user also specifies an optimization operator associated with the business objective at step 106. For example, the user may select whether the function should be maximized or minimized. At step 108, the user specifies which data measures optimization engine 20 may manipulate to reach the best possible value for the selected objective function. Such data measures may be referred to as the decision measures. To complete the problem structure, the user defines at step 110 a set of constraints that must be met so that a solution can be considered valid.

When the user has completed the entry of a new problem instance or the selection or modification of an existing problem instance, the user may communicate a solve command to server at step 112. At step 114, server 12 communicates the problem instance to transformation module 22 and transformation module 22 transforms the problem instance at step 116 from the multi-dimensional data format provided by the user to a format appropriate for an optimization engine 20 that is to be used to solve the problem instance. For example, transformation module 22 may include a parser that translates the syntax of the objective function, constraints, and other components of the problem instance into an appropriate syntax for optimization engine 20. Part of this translation may include generating a number of constraint equations for optimization engine 20 from a single constraint included in the problem instance (since, as described below, each constraint in the problem instance may represent a number of constraints due to the multi-dimensional data format used to express the constraints). Furthermore, transformation module 22 may communicate a request to server 12 for data in data storage locations 14 associated with the problem instance. Alternatively, the data may be communicated along with or part of the problem instance at step 114. The parser or any other appropriate component of transformation module 22 may convert the representation of the data from the multi-dimensional data model to a "flat" data model.

At step 118, transformation module 22 communicates the transformed problem instance to optimization engine 20. Once the problem is solved by optimization engine 20, transformation module 22 receives the solution and transforms the solution back to the multi-dimensional format at step 120. At step 121, transformation module 22 communicates the transformed solution to server 12. If no valid solution exists, optimization engine 20 will indicate that condition. Server 12 presents the solution (or lack thereof) to the user at step 122 via user interface 18. For example, the values of the decision measures at the evaluation level may be presented to the user and the user may visualize the values using the multi-dimensional data model. Optimization engine 20 may also provide information regarding how much the decision measures in the objective function may change without changing the solution of the problem (a sensitivity analysis) and how much a constant bound of each constraint can change without changing the solution of the problem.

While an exemplary method is illustrated and described, system 10 contemplates using any suitable techniques and components for generating an optimization problem using a multi-dimensional data model, transforming the problem for a particular optimization engine 20, and solving the problem. Moreover, certain steps in this method may take place substantially simultaneously and/or in different orders than as described. System 10 also contemplates using other appropriate methods with additional steps, fewer steps, or different steps.

The following examples provide an illustration of the process by which a user may input a problem instance. In these examples, the multi-dimensional data model includes three dimensions: a product dimension 50 (as illustrated in FIG. 2), a geography dimension 70 (as illustrated in FIG. 3), and a time dimension. The model also includes the following measures (possibly among others): price/unit, cost/unit, and sales (the number of units to be sold). Furthermore, as is illustrated in FIGS. 2 and 3, it is assumed that "Laptops" is a member of product dimension 50, "Northeast" is a member of geography dimension 70, and "2001" is a member of the time dimension. The problem domain includes all products, all locations, and all times. The evaluation level for product dimension 50 is family level 64, which has "Executive" and "Student" as members 54. The evaluation level for geography dimension 70 is district level 84, which includes all the districts for each region. The evaluation level for the time dimension is a month level.

An exemplary function to represent the total cost associated with Laptops in the Northeast region in 2001 may be expressed as follows:

(Cost/Unit×Sales)@(Laptops, Northeast, 2001)

where @ represents the association of the aggregation domain (Laptops, Northeast, 2001) to the product of the cost/unit and sales data measures. This analytical expression denotes that the two measures should be multiplied at every intersection for the members at the evaluation level of all three dimensions, and aggregated at the intersection of the following members: "Laptops", "Northeast", and "2001". Examples of the intersections to be considered include: (Executive, District1, January 2001), (Executive, District2, February 2001), (Student, District1, September 2001), and (Student, District3, December 2001). As can be seen from these examples, the intersections considered include every unique combination of the children members at the evaluation level of the "Laptops" member (Executive and Student), the children members of the "Northeast" member (District1, District2, and District3), and the children members of the "2001" member (January 2001, February 2001, March 2001, April 2001, May 2001, Jun 2001, July 2001, August 2001, September 2001, October 2001, November 2001, and December 2001).

If a user indicates that "sales" is the decision measure, the same expression may be used as a business objective by adding an optimization operator as follows:

Minimize (Cost/Unit×Sales)@(Laptops, Northeast, 2001)

This business objective indicates that an optimization engine 20 should determine the values of sales that would minimize the total cost associated with "Laptops" in the "Northeast" during 2001.

As described above, a user may also provide one or more constraints in a problem instance. Two functions and a relational operator are included in a constraint. The relational operators may include the following (or any other appropriate) operators: less than, less than or equal to, greater than, greater than or equal to, and equal to. The functions may be defined as described above. For example, using the assumptions provided above, it is assumed that the user wants to impose a bound to both the cost of "Laptops" in "District1" in January 2001 (for example, the cost must be less than $1 M), and the combined costs of "Laptops" for "District1" and "District2" for the entire year of 2001 (for example, the cost must be less than $10 M). These constraints may be represented as follows:

C1: (Cost/Unit×Sales)@(Laptops, District1, January 2001)<$10 M

C2: (Cost/Unit×Sales)@(Laptops, District1, 2001)+ (Cost/Unit×Sales)@(Laptops, District2, 2001)<$ 10 M A valid solution would respect both constraints simultaneously.

Multi-dimensional data models may include a large number of dimensions and/or members in those dimensions. If a user wants to impose constraints to a large number of intersections among those dimensions, a constraint often needs to be specified for each of the dimensions, even if it is the same constraint function with different data for each intersection. To facilitate this process, server 12 may offer the user a functionality called constraint replication, which allows the user to specify a constraint once, and the constraint is then automatically enforced to a group of predefined intersections. Two exemplary types of constraint replication patterns are exhaustive replication pattern and a regular shift replication pattern.

An exhaustive replication pattern may be used when a particular constraint has to be replicated at intersections with several members that differ in multiple dimensions. As an example, suppose that constraint C1 above for total cost of "Laptops" in "District1" in January 2001 should be replicated for all districts in the "Northeast" and for all months in 2001. To create such constraints, the user defines the coverage set for each dimension. In this case, the coverage sets would be as follows:

Coverage set for Geography: $CS_G$=all districts in the Northeast region={District1, District2, District3}

Coverage set for Time: $CS_T$=all the months in 2001={January 2001, ..., December 2001}

The representation of the constraint for all the districts in the "Northeast" and for all months in 2001 is as follows:

C3: (Cost/Unit×Sales)@(, , )<Max_Cost(,,): (Laptops, $CS_G$, $CS_T$)

where Max_Cost is defined for each relevant intersection. The constraints that are generated from this representation are as follows:

(Cost/Unit×Sales)@(Laptops, District1, January 2001) <Max_Cost(Laptops, District1, January 2001)
...
(Cost/Unit×Sales)@(Laptops, District1, December 2001) <Max_Cost(Laptops, District1, December 2001)
(Cost/Unit×Sales)@(Laptops, District2, January 2001) <Max_Cost(Laptops, District2, January 2001)
...
(Cost/Unit×Sales)@(Laptops, District2, December 2001) <Max_Cost(Laptops, District2, December 2001)
(Cost/Unit×Sales)@(Laptops, District3, January 2001) <Max_Cost(Laptops, District3, January 2001)
...
(Cost/Unit×Sales)@(Laptops, District3, December 2001) <Max_Cost(Laptops, District3, December 2001)

By using constraint replication, a user may impose any number of constraints with a single constraint representation. Furthermore, by using a variable (Max_Cost) for the numerical value in the constraint, the constraint representation may be reused for other problem instances.

A regular shift replication pattern may be used for constraint replication at intersections having members that differ in only one dimension. For example, such a dimension may be the time dimension. Continuing with the previous example, suppose that the user wants to impose a constraint that the total cost of "Laptops" in "District1" in 2001 has to decrease monotonically for the entire year 2001. For example, the total cost in February must be lower than the total cost in January, and the total cost in March must be lower than the total cost in February. In this case, the user defines a coverage set as follows:

Coverage set for Time: $CS_T$=all the months in 2001={January 2001, ..., December 2001}

The members included in the coverage set are specified in the order through which the members are to be "stepped." The user also defines a replication step from one member to the next as being equal to one (step month by month). The representation for such constraint replication is as follows (with the replication step being defined 1 separately):

C4: (Cost/Unit×Sales)@(, , *Start)<(Cost/Unit×Sales)@(, , *Finish): (Laptops, District1, $CS_T$)

where *Start and *Finish indicate the references for starting and finishing the step in the member order within the coverage set. The constraints generated by this pattern are as follows:

(Cost/Unit×Sales)@(Laptops, District1, January 2001)< (Cost/Unit×Sales)@(Laptops, District1, February 2001)
(Cost/Unit×Sales)@(Laptops, District1, February 2001)< (Cost/Unit×Sales)@(Laptops, District1, March 2001)
.
.
.
(Cost/Unit×Sales)@(Laptops, District1, November 2001) <(Cost/Unit×Sales)@(Laptops, District1, December 2001)

For both types of replication patterns described above, the coverage set for the dimensions can be indicated as a function of the problem domain. For example, assuming that the problem domain associated with the example relating to the exhaustive replication pattern is as follows:

Product: P=Laptops
Geography: G=Northeast
Time: T=2001

Constraint C3 may be represented as follows:

(Cost/Unit×Sales)@(, ,)<Max_Cost(,,):(P, Eval. Level (G), Eval. Level(T))

The function Eval. Level( ) automatically creates a coverage set for the associated dimension that includes all the members of the evaluation level for the dimension. Creating the coverage set for the replication patterns based on the problem domain gives the user the capability to create problem structures that are domain independent (the business objective and the constraints are not dependent of any particular member of any dimension). Such problems with domain-independent structures may be readily deployed to any other domain of the multi-dimensional data model.

It should be understood that although exemplary expressions are described above, system 10 may use any other appropriate expression in conjunction with the formulation of a problem instance. For example, any other appropriate syntax may be used. Furthermore, any other appropriate variable names, dimension names, member names, and/or other representations of features of the multi-dimensional data model may be used.

Figure 5:
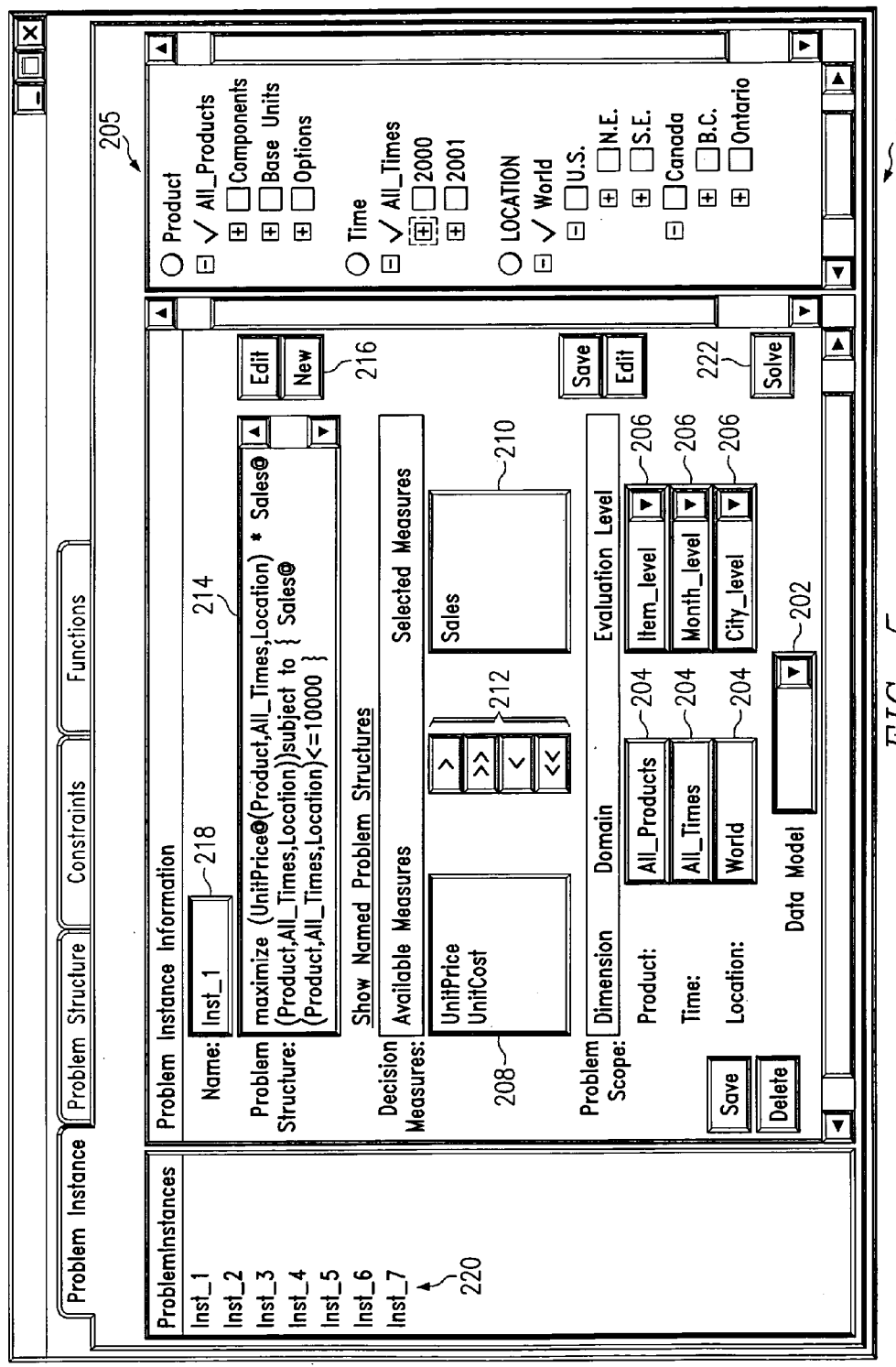
FIGS. 5–9 illustrate exemplary user interfaces associated with a multi-dimensional data optimization system.

FIGS. 5–9 illustrate exemplary graphical user interface (GUI) displays associated with multi-dimensional data optimization system 10. It should be understood that although exemplary GUI displays are illustrated, any appropriate techniques for communicating information to and receiving information from a user may be used. FIG. 5 illustrates an exemplary problem instance GUI display 200. Server 12 may present GUI display 200 to a user via user interface 18 (such as a web browser) upon a request by the user to select or define a problem instance. The user may select a multi-dimensional data model from a data model list 202. If data of the associated business is organized into multiple multi-dimensional data models, then the user may select one of these models from list 202. In a particular embodiment, the data model is selected when the user is ready to solve a specified problem instance and the selected data model indicates which data is to be used to solve the problem.

The user may select an appropriate domain for a problem instance by inputting a member of each dimension of the selected data model in domain fields 204. GUI display 200 may provide a tree structure 205 that hierarchically illustrates the various members of each dimension to assist the user in selecting an appropriate domain. Furthermore, the user may select an appropriate evaluation level for each dimension from an evaluation level list 206 associated with each dimension. GUI display 200 also allows the user to select one or more decision measures. For example, GUI display 200 provides user with an available measures list 208 where the user may select one or more measures and place them in a selected measures list 210 by using an appropriate button 212.

Moreover, GUI display 200 allows the user to input a problem structure (including an objective function and one or more constraints). For example, the user may directly input a problem structure in a problem structure field 214 or the user may create the problem structure by selecting a new problem structure button 216. Button 216 initiates the presentation of additional GUI displays to allow the user to build a problem structure, as described below. GUI display 200 also provides a problem instance name field 218 in which the user may provide a problem instance name for later reference. For example, once a problem instance has been created and named, the user may access the problem instance by selecting a problem instance name from a saved problem instance list 220. When the user has created a problem instance or has modified a pre-existing problem instance, the user may initiate the transformation and solving of the problem instance by selecting a solve button 222.

Figure 6:
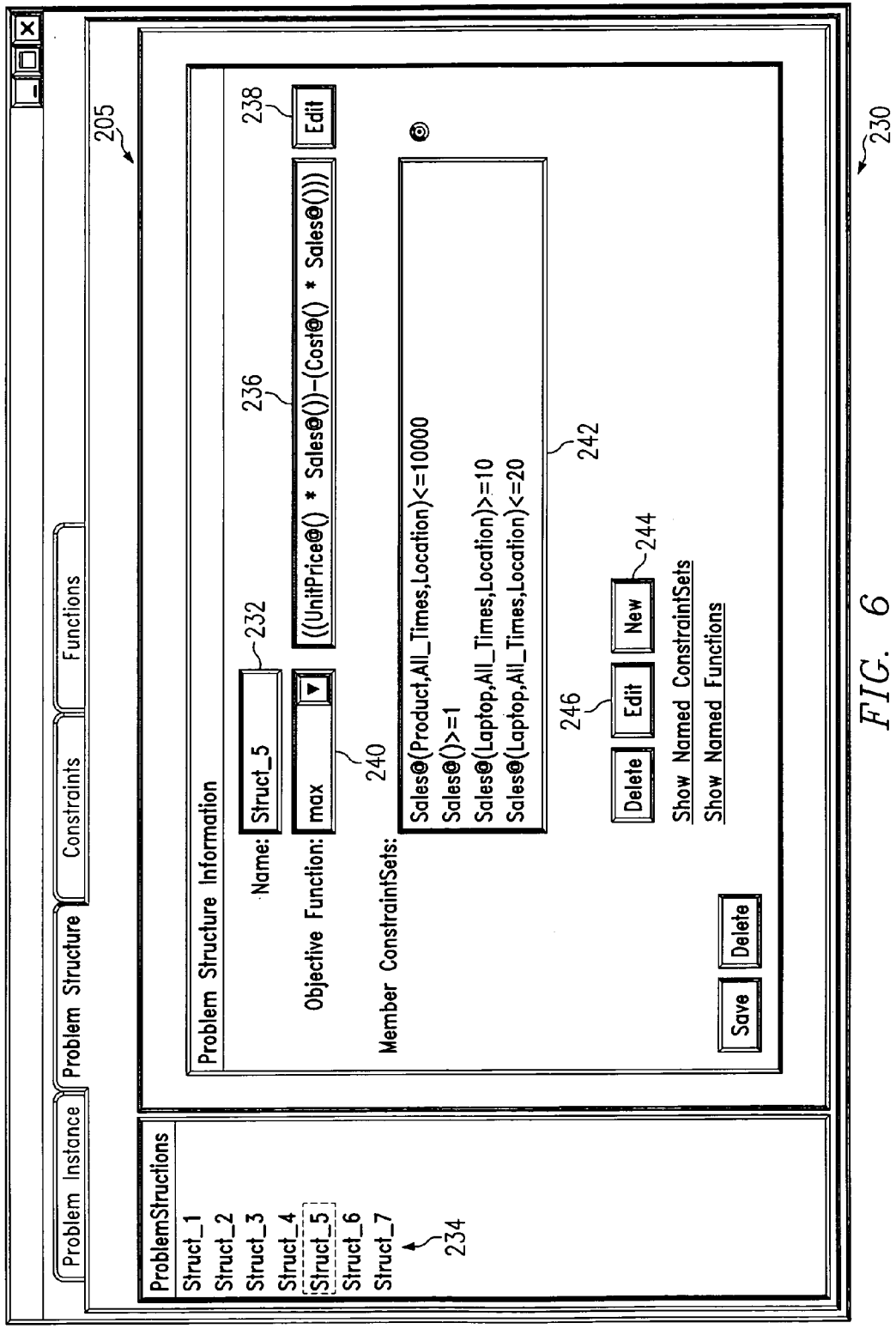

FIG. 6 illustrates an exemplary problem structure GUI display 230. GUI display 230 may be provided to the user upon selection of new problem structure button 216. GUI display 230 includes a problem structure name field 232 in which a user may name a problem structure for later reference. For example, saved problem structure names may be listed in and selected from a problem structure list 234. A user may also input a function or measure to be optimized in a function field 236 or the user may select a function edit button 238 to receive a function editor GUI display, described below. GUI display 230 also includes an optimization operator field 240 in which the user may enter or select an appropriate operator. Furthermore, GUI display 230 includes a constraint set field 242 in which the user may input one or more problem constraints. Alternatively, the user may create a new constraint set or edit an existing constraint set by selecting a new constraint set button 244 or an edit constraint set button 246, respectively.

Figure 7:
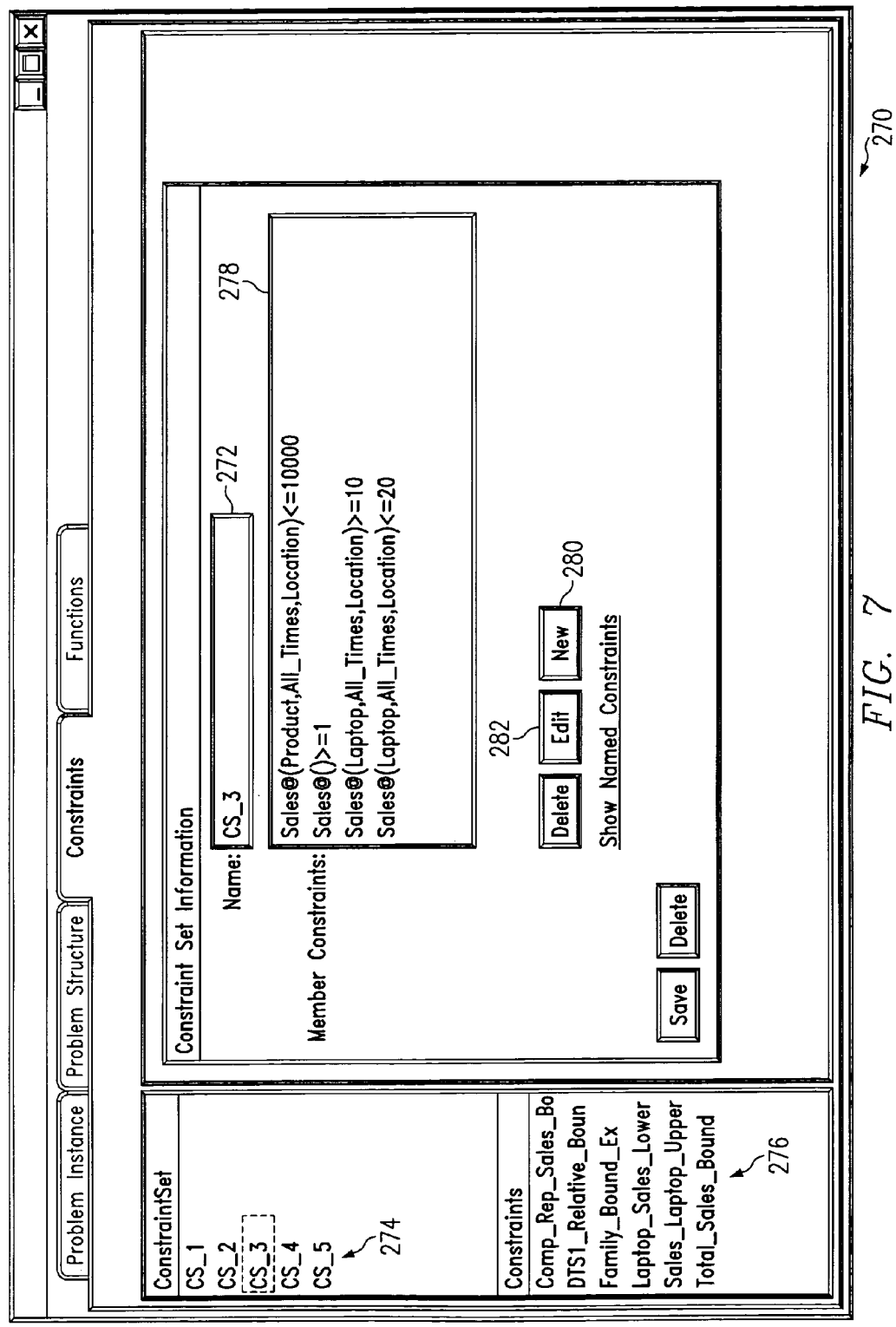

FIG. 7 illustrates an exemplary constraint set editor GUI display 270 that may be provided to the user upon selection of new constraint set button 244 or edit constraint set button 246. GUI display 270 includes a constraint set name field 272 in which a user may name a constraint set for later reference. For example, saved constraint set names may be listed in and selected from a constraint set list 274. GUI display 270 also provides a constraint list 276 that includes the names of the constraints included within a selected constraint set. Furthermore, GUI display 270 includes a constraint set field 278 in which the user may input one or more problem constraints. Alternatively, the user may create a new constraint or edit an existing constraint by selecting a new constraint button 280 or an edit constraint button 282, respectively.

Figure 8:
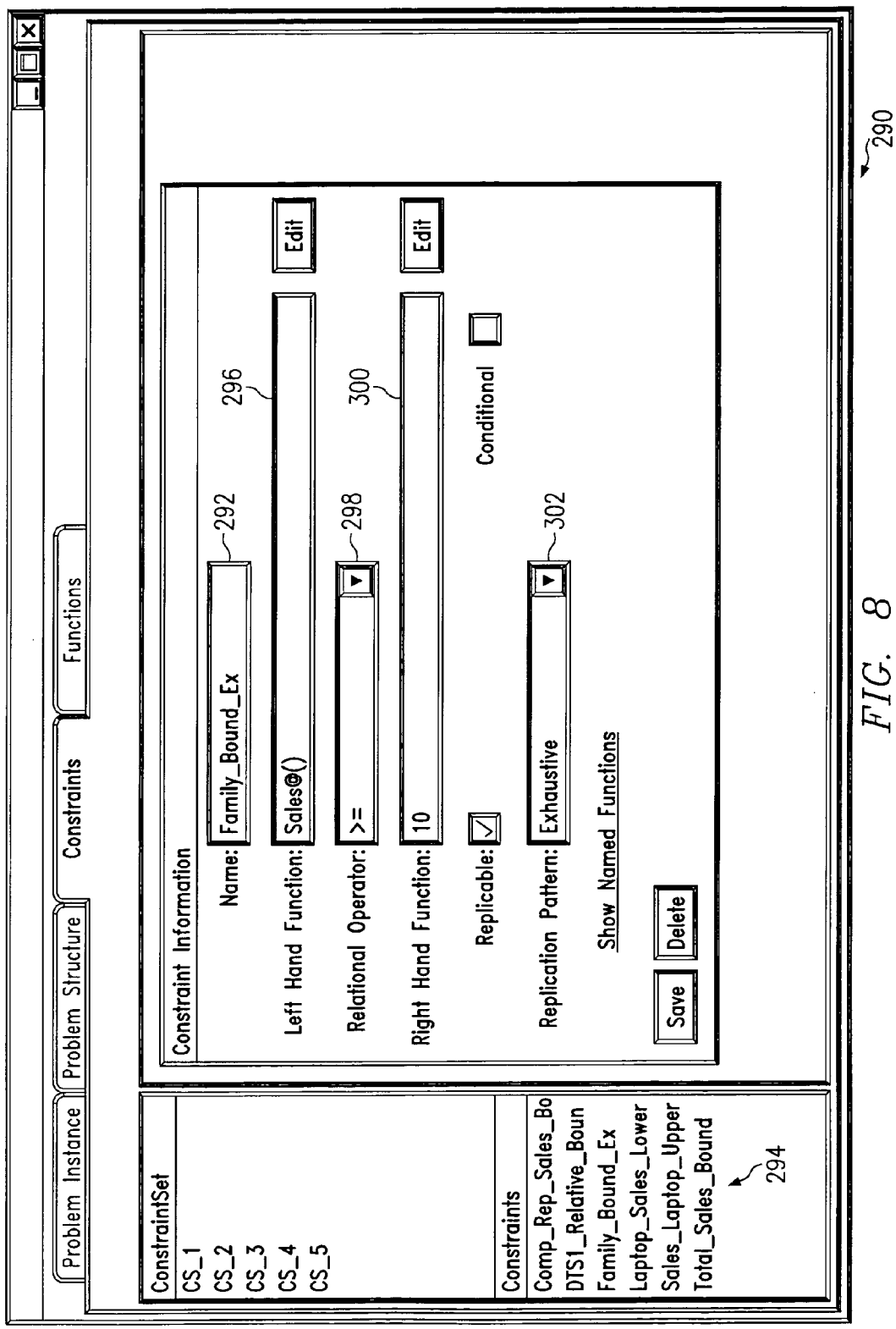

FIG. 8 illustrates an exemplary constraint editor GUI display 290 that may be provided to the user upon selection of new constraint button 280 or edit constraint button 282. GUI display 290 includes a constraint name field 292 in which a user may name a constraint set for later reference. For example, saved constraint set names may be listed in and selected from a constraint list 294. GUI display 290 also provides fields in which the user may enter in the components of a constraint. For example, GUI display 290 includes a left hand function field 296, a relational operator field 298, and a right hand function field 300 in which a user may input or select these respective components of a constraint. Furthermore, GUI display 290 allows the user to specify whether a constraint is to be replicated and, if so, how the constraint is to be replicated. For example, GUI display 290 provides a replication pattern list 302 from which a user may select a replication pattern. Server 12 may provide additional GUI displays in which the user may specify details relating to the replication pattern (or these details may be specified using GUI display 290).

Figure 9:
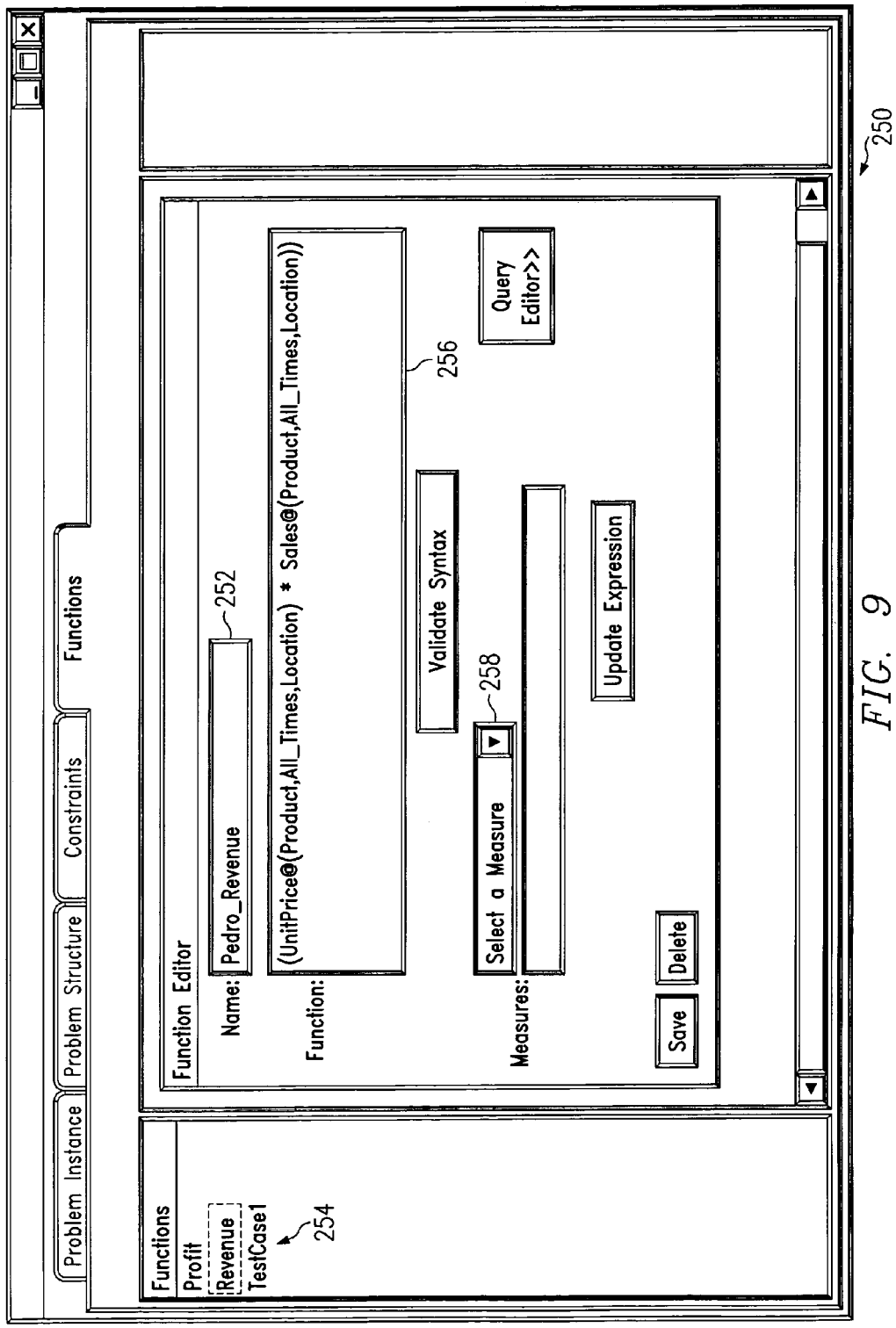

FIG. 9 illustrates an exemplary function editor GUI display 250 that may be provided to the user upon selection of function edit button 238. GUI display 250 includes a function name field 252 in which a user may name a function for later reference. For example, saved function names may be listed in and selected from a function list 254. GUI display 250 also provides a function field 256 in which a user may also input a function or measure to be optimized. To assist with this task, GUI display 250 may provide a list 258 of measures included in the selected data model and the user may select one or more of these measures to include in the function. Furthermore, GUI display 250 may provide a syntax validation button 260 which the user may select to have server 12 or another appropriate component of system 10 check the format of the function input by the user. As described above, any appropriate format may be used with a particular embodiment of system 10.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for optimization using multi-dimensional data, comprising:
    a server operable to:
        using a multi-dimensional data model, organize data stored at one or more data storage locations, the multi-dimensional data model including a plurality of data dimensions each including a hierarchy of members;
        receive input from a user specifying a problem instance to be solved using an optimization engine, the problem instance specified by the user in a multi-dimensional format, the optimization engine being unable to solve the problem instance in the multi-dimensional format, the problem instance including:
            a problem domain including all data in the multi-dimensional data model located hierarchically below one or more specified intersections in the multi-dimensional data model, each intersection identified by specifying a member in each data dimension;

an evaluation level specified by identifying a particular level in the hierarchy of each data dimension;

an objective function including a data measure or a combination of data measures to be optimized; and one or more problem constraints; and communicate the problem instance in the multi-dimensional format; and a transformation module operable to:

receive the problem instance in the multi-dimensional format;

transform the problem instance into a format appropriate for the optimization engine, the transformation including parsing the received problem instance to identify pre defined multi-dimensional syntax and translating the multi-dimensional syntax to a syntax appropriate for the optimization engine;

communicate the transformed problem instance to the optimization engine to be solved;

receive a solution associated with the problem instance from the optimization engine;

transform the solution into the multi-dimensional format; and communicate the transformed solution to the server.

2. The system of claim 1, further comprising a business repository operable to store the multi-dimensional data model, the server further operable to communicate with the business repository to access data specified using the multi-dimensional format.

3. The system of claim 1, wherein transforming the problem instance further comprises generating multiple problem constraints in a format appropriate for the optimization engine from a single problem constraint included in the received problem instance, the single problem constraint identifying a member in each data dimension to which the constraint is applicable.

4. The system of claim 1, wherein transforming the problem instance further comprises importing data applicable to the problem instance from one or more data storage locations, the imported data being included in the transformed problem instance in a format appropriate for the optimization engine.

5. The system of claim 1, wherein one or more data measures included in the objective function have an associated data value in a data storage location for each of one or more intersections in the problem domain.

6. The system of claim 1, wherein the objective function further comprises an aggregation domain for each data measure.

7. The system of claim 1, wherein the server is further operable to replicate a single constraint in the multi-dimensional format into multiple constraints in the multi-dimensional format, the single constraint including one or more coverage sets identifying multiple members of one or more data dimensions to which the constraint applies.

8. A method for optimization using multi-dimensional data, comprising:

receiving a problem instance to be solved using an optimization engine, the problem instance specified in a multi-dimensional format associated with a multi-dimensional data model including a plurality of data dimensions each including a hierarchy of members, the optimization engine being unable to solve the problem instance in the multi-dimensional format, the problem instance including:

a problem domain including all data in the multi-dimensional data model that located hierarchically below one or more specified intersections in the multi-dimensional data model, each intersection identified by specifying a member in each data dimension;

an evaluation level specified by identifying a particular level in the hierarchy of each data dimension;

an objective function including a data measure or a combination of data measures to be optimized; and one or more problem constraints; and communicate the problem instance in the multi-dimensional format; and using a transformation module, transforming the problem instance into a format appropriate for the optimization engine, the transformation including parsing the received problem instance to identify pre-defined multi-dimensional syntax and translating the multi-dimensional syntax to a syntax appropriate for the optimization engine;

communicating the transformed problem instance to the optimization engine to be solved;

receiving a solution associated with the problem instance from the optimization engine;

using the transformation module, transforming the solution into the multi-dimensional format; and communicating the transformed solution to the server.

9. The method of claim 8, wherein transforming the problem instance further comprises:

parsing the received problem instance to identify pre-defined multi-dimensional syntax; and translating the multi-dimensional syntax to a syntax appropriate for the optimization engine.

10. The method of claim 8, wherein transforming the problem instance further comprises importing data applicable to the problem instance from one or more data storage locations, the imported data being included in the transformed problem instance in a format appropriate for the optimization engine.

11. The method of claim 8, wherein one or more data measures included in the objective function have an associated data value in a data storage location for each of one or more intersections in the problem domain.

12. The method of claim 8, wherein the objective function further comprises an aggregation domain for each data measure.

13. The method of claim 8, further comprising automatically replicating a single constraint in the multi-dimensional format into multiple constraints in the multi-dimensional format, the single constraint including one or more coverage sets identifying multiple members of one or more data dimensions to which the constraint applies.

14. Software enabling optimization using multi-dimensional data, the software embodied in a computer-readable medium and when executed operable to:

receive a problem instance to be solved using an optimization engine, the problem instance specified in a multi-dimensional format associated with a multi-dimensional data model including a plurality of data dimensions each including a hierarchy of members, the optimization engine being unable to solve the problem instance in the multi-dimensional format, the problem instance including:

a problem domain including all data in the multi-dimensional data model located hierarchically below one or more specified intersections in the multi-dimensional data model, each intersection identified by specifying a member in each data dimension;

an evaluation level specified by identifying a particular level in the hierarchy of each data dimension;

an objective function including a data measure or a combination of data measures to be optimized; and one or more problem constraints; and communicate the problem instance in the multi-dimensional format; and transform the problem instance into a format appropriate for the optimization engine, the transformation including parsing the received problem instance to identify pre-defined multi-dimensional syntax and translating the multi-dimensional syntax to a syntax appropriate for the optimization engine;

communicate the transformed problem instance to the optimization engine to be solved;

receive a solution associated with the problem instance from the optimization engine;

transform the solution into the multi-dimensional format; and communicate the transformed solution to the server.

15. The software of claim 14, wherein transforming the problem instance further comprises generating multiple problem constraints in a format appropriate for the optimization engine from a single problem constraint included in the specified problem instance, the single problem constraint identifying a member in each data dimension to which the constraint is applicable.

16. The software of claim 14, wherein transforming the problem instance further comprises importing data applicable to the problem instance from one or more data storage locations, the imported data being included in the transformed problem instance in a format appropriate for the optimization engine.

17. The software of claim 14, wherein one or more data measures included in the objective function have an associated data value in a data storage location for each of one or more intersections in the problem domain.

18. The software of claim 14, wherein the objective function further comprises an aggregation domain for each data measure.

19. The software of claim 14, further operable to replicate a single constraint in the multi-dimensional format into multiple constraints in the multi-dimensional format, the single constraint including one or more coverage sets identifying multiple members of one or more data dimensions to which the constraint applies.

20. A system for optimization using multi-dimensional data, comprising:

means for receiving a problem instance to be solved using an optimization engine, the problem instance specified in a multi-dimensional format associated with a multi-dimensional data model including a plurality of data dimensions each including a hierarchy of members, the optimization engine being unable to solve the problem instance in the multi-dimensional format;

means for including a problem domain including all data in the multi-dimensional data model that is located hierarchically below one or more specified intersections in the multi-dimensional data model, each intersection identified by specifying a member in each data dimension;

means for including an evaluation level specified by identifying a particular level in the hierarchy of each data dimension;

means for including an objective function including a data measure or a combination of data measures to be optimized and one or more problem constraints;

means for transforming the problem instance into a format appropriate for the optimization engine;

means for parsing the received problem instance to identify pre defined multi-dimensional syntax;

means for translating the multi-dimensional syntax to a syntax appropriate for the optimization engine;

means for communicating the transformed problem instance to the optimization engine to be solved;

means for receiving a solution associated with the problem instance to the optimization engine;

means for transforming the solution into the multi-dimensional format; and means for communicating the transformed solution to the server.

* * * * *